United States Patent
Pena-Finol et al.

[11] Patent Number: 5,832,370
[45] Date of Patent: Nov. 3, 1998

[54] CURRENT MODE TRANSCEIVER CIRCUIT AND METHOD

[75] Inventors: Jesus S. Pena-Finol; Mark J. Chambers, both of Gilbert; Erica G. Miller, Tempe; Philippe Gorisse, Mesa, all of Ariz.

[73] Assignee: Motorola, Inc., Schaumburg, Ill.

[21] Appl. No.: 721,399

[22] Filed: Sep. 26, 1996

[51] Int. Cl.$^6$ ..................................................... H04B 1/38
[52] U.S. Cl. ............................................. 455/73; 455/334
[58] Field of Search ............................. 455/73, 550, 575, 455/90, 334, 337, 63, 296

[56] References Cited

U.S. PATENT DOCUMENTS

| | | | |
|---|---|---|---|
| 4,929,594 | 5/1990 | Heck et al. | 455/334 |
| 5,596,298 | 1/1997 | Miller et al. | 455/337 |
| 5,691,670 | 11/1997 | Lohninger | 455/333 |
| 5,708,399 | 1/1998 | Fujii et al. | 455/333 |

OTHER PUBLICATIONS

Klaas Bult et al., IEEE Journal of Solid–State Circuits, "A Fast–Settling CMOS Op Amp for SC Circuits with 90–dB DC Gain", 1990, vol. 25, No. 6, Dec. 1990, pp. 1379–1384.

*Primary Examiner*—Reinhard J. Eisenzopf
*Assistant Examiner*—Marsha D. Banks-Harold
*Attorney, Agent, or Firm*—Robert F. Hightower; Robert D. Atkins

[57] ABSTRACT

A transmitter (300) sends a transmitted current ($I_{203}$, $I_{204}$) along a transmit signal path (203, 204) to a receiver (400) having a low input impedance. The receiver includes a transistor structure (402, 404) that amplifies the transmitted current and feeds it back to the input of the receiver to maintain the low input impedance and a substantially constant voltage on the transmit signal path. The substantially constant voltage at the input of the receiver avoids interference with other circuits (206, 208) located along the transmit signal path.

7 Claims, 2 Drawing Sheets

CURRENT MODE TRANSCEIVER CIRCUIT AND METHOD

BACKGROUND OF THE INVENTION

The present invention relates in general to transceiver circuits and, more particularly, to a transceiver circuit having a low impedance input node coupled for receiving a transmitted current.

Transceiver (transmitter and receiver) circuits are well known in communication devices for transmitting signals over a long distance. For example, an integrated circuit (IC) may include a transmitter that sends a transmitted signal to a receiver circuit at an opposite side of the IC. The transmitter circuit typically transmits a digital voltage signal to the receiver circuit. The IC may include other digital and analog circuits positioned along the transmit signal path. The digital voltage signal often operates at a high frequency and induces interference in the adjacent analog and digital circuitry in the form of voltage spikes and spurious noise. Alternately, the transmitter may send analog signals to the receiver. The analog signals can interfere with the analog circuitry adjacent to the transmit signal path.

One solution to the interference problem is to locate the analog and digital circuitry at a sufficient distance from the digital transmission path to avoid interference. However, such isolation is often impractical without substantially increasing die size and creates layout problems in the IC. Alternately, the transmitter may transmit a current to the receiver circuit. A prior art current mode receiver circuit includes a bipolar transistor having an emitter coupled for receiving the transmitted current. A current source conducts a constant DC current through the collector-emitter conduction path of the transistor. The base of the transistor receives a reference voltage. The collector conducts the DC current modulated by the transmitted current. The input impedance to the receiver is defined by the emitter resistance of the transistor and typically is not low enough to prevent undesirable voltage swings from occurring along the transmit signal path. The voltage variation on the transmission path causes interference with adjacent analog and digital circuitry.

Hence, a need exists to lower the input impedance of the receiver to avoid voltage variation and interference on the transmit signal path.

DETAILED DESCRIPTION OF THE PREFERRED EMBODIMENT

Figure 1:
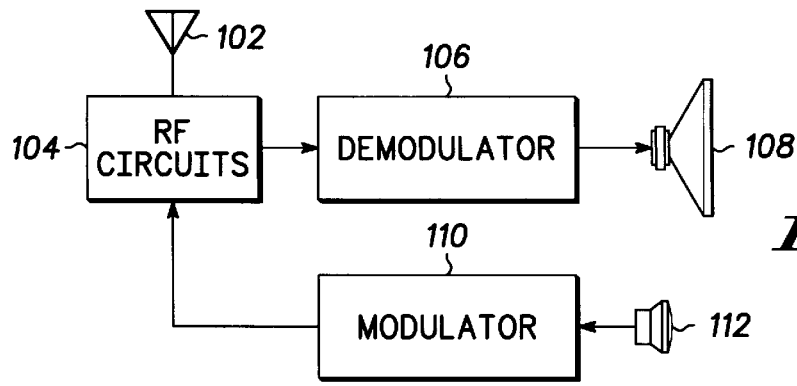
FIG. 1 is a block diagram illustrating a wireless communication device.

Referring to FIG. 1, a wireless communication device 100 is shown including an antenna 102 that receives a radio frequency (RF) input signal. Examples of wireless communication device 100 include cellular telephones, digital pagers, two-way radios, etc. RF circuit 104 down-converts the RF signal to an intermediate frequency (IF) signal. Demodulator 106 converts the IF signal to baseband for broadcast out speaker 108. Microphone 112 receives a voice signal and passes it through modulator 110 which modulates a carrier signal. RF circuit 104 up-converts and amplifies the modulated carrier signal for transmission out antenna 102. RF circuit 104, demodulator 106, and modulator 110 are typically mixed-mode devices operating with both analog and digital circuits.

Figure 2:
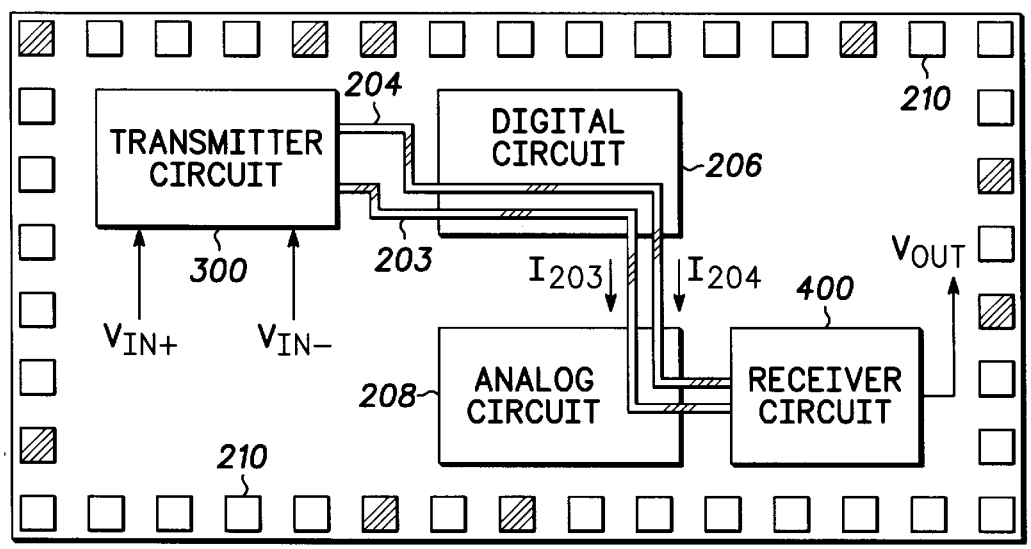
FIG. 2 is a block diagram illustrating an integrated transceiver circuit.

In FIG. 2, demodulator 106 is shown as an integrated transceiver circuit including both digital circuit 206 and analog circuit 208. Alternately, the integrated transceiver circuit could be in RF circuit 104 or modulator 110. The integrated circuit includes a plurality of bonding pads 210 for communication with external circuits. Transmitter circuit 300 receives differential input voltage signals $V_{IN+}$ and $V_{IN-}$ and transmits differential output currents $I_{203}$ and $I_{204}$ along transmit signal path conductors 203 and 204 to receiver circuit 400. The input voltage signals can be either digital or analog. Digital circuit 206 and analog circuit 208 are located along transmit signal conductors 203 and 204 between transmitter 300 and receiver 400. For example, demodulator 106 may be a multilayer integrated circuit where conductors 203 and 204 are routed over the top of digital circuit 206 and analog circuit 208. The conductors 203 and 204 could potentially cause interference between the transmitted signals and digital circuit 206 and analog circuit 208. To avoid such interference, transmitter circuit 300 converts input voltage signals $V_{IN+}$ and $V_{IN-}$ to current signals $I_{203}$ and $I_{204}$, which are transmitted along transmit signal conductors 203 and 204, respectively. The input impedance of receiver circuit 400 is made sufficiently low to reduce voltage variations on conductors 203 and 204 and thereby avoid any interference with digital circuit 206 and analog circuit 208.

Figure 3:
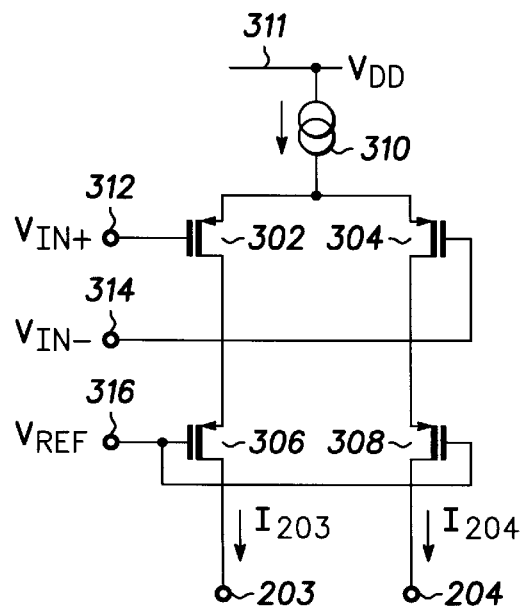
FIG. 3 is a schematic diagram of the transmitter section of the transceiver circuit.

Turning to FIG. 3, further detail of transmitter circuit 300 is shown including transistors 302 and 304 receiving a differential voltage signal $V_{IN+}$ and $V_{IN-}$ at gate terminals 312 and 314. Current source 310, referenced to power supply conductor 311 operating at $V_{DD}=3.0$ volts, is coupled to the sources of transistors 302 and 304. The drains of transistors 302 and 304 are coupled to the sources of transistors 306 and 308, respectively. The gate terminal 316 of transistors 306 and 308 receive a reference voltage $V_{REF}$ operating for example at $V_{DD}/2$. The drains of transistors 306 and 308 provide differential output currents $I_{203}$ and $I_{204}$ on conductors 203 and 204 having magnitudes of say 10 microamps, respectively.

Transmitter circuit 300 converts the differential voltage $V_{IN+}$ and $V_{IN-}$ to differential currents $I_{203}$ and $I_{204}$. Transistor 306 is cascoded with transistor 302, and transistor 308 is cascoded with transistor 304, for reducing the capacitive coupling between the gate and drains of transistors 302 and 304.

Figure 4:
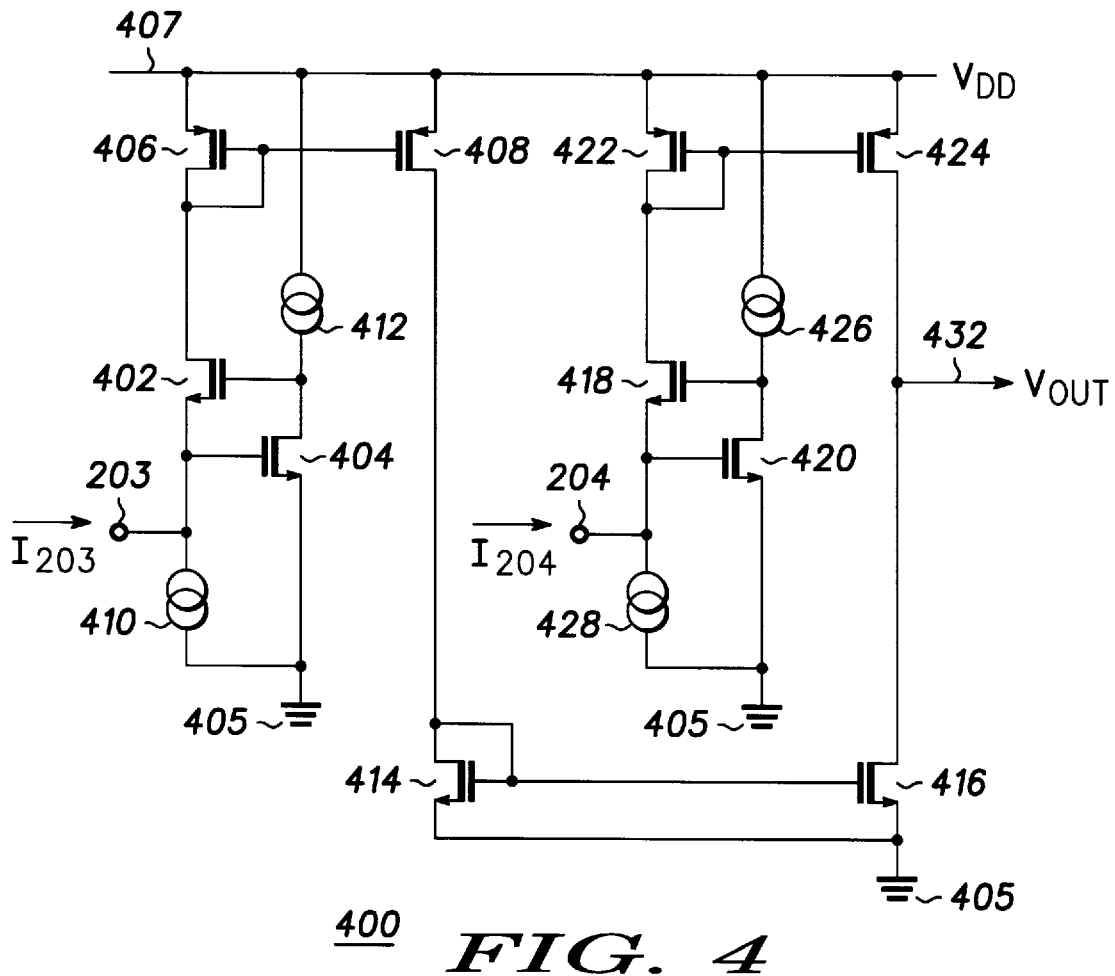
FIG. 4 is a schematic diagram illustrating a differential receiver section of the transceiver circuit.

Referring to FIG. 4, receiver circuit 400 is shown including transistor 402 having a source coupled to conductor 203 at the input of receiver circuit 400 for receiving current $I_{203}$. Current source 410 has an output coupled to the source of transistor 402 and to the gate of transistor 404. Transistor 404 has a source coupled to power supply conductor 405 operating at ground potential. The drain of transistor 404 is coupled to the gate of transistor 402 and to an output of current source 412 referenced to power supply conductor 407 operating at a positive potential $V_{DD}=3.0$ volts. The drain of transistor 402 is coupled to an input of a current mirror circuit comprising transistors 406 and 408. The output of current mirror 406–408 is coupled to the input of a current mirror comprising transistors 414 and 416.

Receiver circuit 400 further includes transistor 418 having a source coupled to conductor 204 at a second input of receiver circuit 400 for receiving current $I_{204}$. Current source 428 has an output coupled to the source of transistor 418 and to the gate of transistor 420. Transistor 420 has a source coupled to power supply conductor 405. The drain of transistor 420 is coupled to the gate of transistor 418 and to an output of current source 426 referenced to power supply conductor 407. The drain of transistor 418 is coupled to an input of a current mirror circuit comprising transistors 422 and 424. The outputs of the current mirror 414–416 and the current mirror 422–424 provide a single-ended output voltage $V_{OUT}$ on conductor 432.

The operation of receiver circuit 400 proceeds as follows. A DC current defined by current source 410 flows through the drain-source conduction paths of transistors 402 and 406. The transmitted current $I_{203}$ modulates the DC current in transistor 402 and provides a modulated signal at the gate of transistor 404. Transistor 404 amplifies and inverts the modulated signal to the gate of transistor 402. Transistor 402 feeds back the amplified and inverted modulated signal to conductor 203. As the voltage level on conductor 203 increases, transistor 404 conducts more current causing the voltage at the gate of transistor 402 to decrease. Transistor 402 conducts less current to counter the increasing voltage level. Therefore, the voltage at the source of transistor 402 remains substantially constant. The feedback provided by transistors 404 and 402 maintains the impedance at the source of transistor 402 at a sufficiently low value to avoid voltage variation at conductor 203. Reducing the variation in voltage level along conductor 203 minimizes the interference with digital circuit 206 and analog circuit 208 in FIG. 2.

A similar process follows for transistors 418 and 420 where a DC current defined by current source 428 flows through the drain-source conduction paths of transistors 418 and 422. The transmitted current $I_{204}$ modulates the DC current in transistor 418 and provides a modulated signal at the gate of transistor 420. Transistor 420 amplifies and inverts the modulated signal to the gate of transistor 418. Transistor 418 feeds back the amplified and inverted modulated signal to conductor 204. As the voltage level on conductor 204 increases, transistor 420 conducts more current causing the voltage at the gate of transistor 418 to decrease. Transistor 418 conducts less current to counter the increasing voltage level. The voltage at the source of transistor 418 remains substantially constant. The feedback provided by transistors 418 and 420 maintains the impedance at the source of transistor 418 at a sufficiently low value to avoid voltage variation at conductor 204. Reducing the variation in voltage level along conductor 204 minimizes the interference with digital circuit 206 and analog circuit 208 in FIG. 2.

Thus, as a feature of the present invention, the feedback arrangement through transistors 402 and 404 provides a low impedance to reduce voltage variation on conductor 203 and avoid interference with other circuitry. Likewise, the feedback arrangement through transistors 418 and 420 provides a low impedance to reduce voltage variation on conductor 204 and avoid interference with other circuitry. The modulated current in transistor 402 flows into current mirror 406–408 which provides a mirrored current to current mirror 414–416. The mirrored current flowing into current mirror 414–416 provides another mirrored current to conductor 432. The modulated current in transistor 418 flows into current mirror 422–424. The outputs of current mirror 414–416 and current mirror 422–424 are coupled to conductor 432 for providing a single-ended output voltage $V_{OUT}$.

Figure 5:
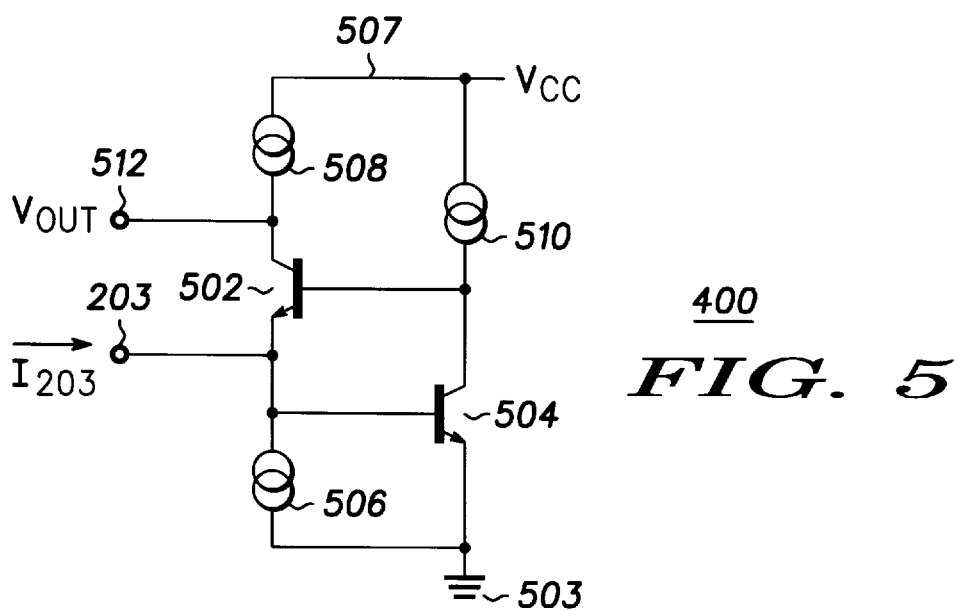
FIG. 5 is a schematic diagram of a single-ended receiver section of the transceiver.

Turning to FIG. 5, an alternate embodiment of receiver 400 is shown including transistor 504 having a base coupled to an input of receiver 400 at conductor 203 and an emitter coupled to power supply conductor 503 operating at ground potential. The collector of transistor 504 is coupled to an output of current source 510 referenced to power supply conductor 507 operating at a positive potential $V_{CC}$=3.0 volts. The collector of transistor 504 is also coupled to the base of transistor 502. The emitter of transistor 502 is coupled to the base of transistor 504 and to the output of current source 506. The collector of transistor 502 is coupled to the output of current source 508, which is referenced to power supply conductor 507, to provide a single-ended output $V_{OUT}$ on conductor 512.

Operation of the receiver shown in FIG. 5 is similar to the operation of the receiver of FIG. 4. Current source 506 supplies a DC current through the collector-emitter conduction path of transistor 502. The transmitted current $I_{203}$ modulates the DC current in transistor 502 and provides a modulated signal at the base of transistor 504. Transistor 504 amplifies and inverts the modulated signal to the base of transistor 502. Transistor 502 feeds back the amplified and inverted modulated signal to conductor 203. As the voltage level on conductor 203 increases, transistor 504 conducts more current causing the voltage at the base of transistor 502 to decrease. Transistor 502 conducts less current to counter the increasing voltage level. The voltage at the emitter of transistor 502 remains substantially constant. The feedback provided by transistors 504 and 502 maintains the impedance at the emitter of transistor 504 at a sufficiently low value to avoid voltage variation at conductor 203. Reducing the variation in voltage level along conductor 203 minimizes the interference with digital circuit 206 and analog circuit 208 in FIG. 2.

The receiver 400 shown in FIG. 5 is a single-ended embodiment which receives a single-ended input current $I_{203}$ at conductor 203 and produces a single-ended output voltage $V_{OUT}$ at output terminal 512. Where the input current comprises a differential current having, for example, true and complementary components, a differential embodiment is readily provided by duplicating components 502–512. Components 502–512 process the true component of the differential input current and the duplicate circuit processes the complementary component.

The embodiment shown in FIG. 4 demonstrates a metal-oxide-semiconductor (MOS) implementation of the present invention. The embodiment shown in FIG. 5 demonstrates a bipolar implementation of the present invention. One of ordinary skill in the art would understand the interchangeability of technologies in implementing the present invention. Furthermore, current sources 410 and 412 and current sources 426 and 428 may be implemented by resistors. Likewise, current sources 506, 508 and 510 may be implemented by resistors.

In an alternate embodiment of the present invention, the n-channel MOS transistors shown in FIG. 4 could be implemented with p-channel MOS transistors while the NPN bipolar transistors shown in FIG. 5 could be implemented as PNP bipolar transistors. Likewise, the p-channel MOS transistors shown in FIG. 3 could be implemented as n-channel MOS devices or as bipolar devices.

By now it should be appreciated that the present invention provides a transmitter that sends a transmitted current along a transmit signal path to a receiver having a low input impedance. The receiver includes a transistor structure that amplifies the transmitted current and feeds it back to the input of the receiver to maintain the low input impedance and a substantially constant voltage on the transmit signal path. The substantially constant voltage at the input of the receiver avoids interference with other circuits located along the transmit signal path.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. An integrated transceiver circuit, comprising:

a transmit signal path for conducting a transmitted current; and a receiver having a first input coupled for receiving the transmitted current, the receiver including, (a) a first transistor having a control terminal coupled to the first input of the receiver, and a first conduction terminal coupled to a first power supply conductor, and (b) a second transistor having a control terminal coupled to a second conduction terminal of the first transistor, a first conduction terminal for conducting a first modulated current, and a second conduction terminal coupled to the first input of the receiver.

2. The integrated transceiver circuit of claim 1 further including a transmitter having an input coupled for receiving a first input signal and having an output coupled to the transmit signal path for providing the transmitted current.

3. The integrated transceiver circuit of claim 2 wherein the transmitter includes:

a third transistor having a control terminal coupled for receiving the first input signal, and a first conduction terminal coupled for providing a first component of the transmitted current;

a fourth transistor having a control terminal coupled for receiving a second input signal, and a first conduction terminal coupled for providing a second component of the transmitted current; and a current source having an output coupled to second conduction terminals of the third and fourth transistors.

4. The integrated transceiver circuit of claim 1 wherein the receiver further includes:

a first current source having an output coupled to the second conduction terminal of the first transistor; and a second current source having an output coupled to the second conduction terminal of the second transistor.

5. The integrated transceiver circuit of claim 4 wherein the receiver further includes a third current source having an output coupled to the first conduction terminal of the second transistor for providing an output voltage of the receiver.

6. The integrated transceiver circuit of claim 4 wherein the receiver further includes a second input where the first input of the receiver receives a first component of the transmitted current and the second input of the receiver receives a second component of the transmitted current.

7. The integrated transceiver circuit of claim 6 wherein the receiver further includes:

a third transistor having a control terminal coupled to the second input of the receiver, and a first conduction terminal coupled to the first power supply conductor;

a fourth transistor having a control terminal coupled to a second conduction terminal of the third transistor, a first conduction terminal for conducting a second modulated current, and a second conduction terminal coupled to the second input of the receiver;

a third current source having an output coupled to the second conduction terminal of the third transistor;

a fourth current source having an output coupled to the second conduction terminal of the fourth transistor;

a first current mirror having an input coupled to the first conduction terminal of the second transistor;

a second current mirror having an input coupled to an output of the first current mirror; and a third current mirror having an input coupled to the first conduction terminal of the fourth transistor and having an output coupled to an output of the second current mirror for providing an output voltage of the receiver.

* * * * *